United States Patent
Helenius et al.

(10) Patent No.: US 11,554,937 B2
(45) Date of Patent: Jan. 17, 2023

(54) ROPE WHEEL, TRACTION WHEEL, ELEVATOR DRIVE MACHINERY AND ELEVATOR

(71) Applicant: Kone Corporation, Helsinki (FI)

(72) Inventors: Juha Helenius, Helsinki (FI); Raimo Pelto-Huikko, Helsinki (FI); Aleksi Nareikko, Helsinki (FI); Mika Juntunen, Helsinki (FI)

(73) Assignee: Kone Corporation, Helsinki (FI)

( * ) Notice: Subject to any disclaimer, the term of this patent is extended or adjusted under 35 U.S.C. 154(b) by 16 days.

(21) Appl. No.: 17/211,157

(22) Filed: Mar. 24, 2021

(65) Prior Publication Data

US 2021/0300728 A1    Sep. 30, 2021

(30) Foreign Application Priority Data

Mar. 26, 2020 (EP) ..................... 20166000

(51) Int. Cl.
| | | |
|---|---|---|
| *B66B 15/04* | (2006.01) | |
| *B66B 7/06* | (2006.01) | |
| *B66B 11/08* | (2006.01) | |
| *B66B 15/02* | (2006.01) | |

(52) U.S. Cl.
CPC .............. *B66B 15/04* (2013.01); *B66B 7/062* (2013.01); *B66B 7/068* (2013.01); *B66B 11/08* (2013.01); *B66B 15/02* (2013.01)

(58) Field of Classification Search
CPC ......... B66B 15/04; B66B 7/062; B66B 7/068; B66B 11/08; B66B 15/02
See application file for complete search history.

(56) References Cited

U.S. PATENT DOCUMENTS

| | | | | |
|---|---|---|---|---|
| 11,345,574 | B2 * | 5/2022 | Helenius | B66B 11/043 |
| 2012/0318615 | A1 * | 12/2012 | Aulanko | B66B 15/04 |
| | | | | 187/254 |
| 2013/0056304 | A1 * | 3/2013 | Sanchez | B66B 11/08 |
| | | | | 187/255 |

(Continued)

FOREIGN PATENT DOCUMENTS

| | | |
|---|---|---|
| CN | 201553526 U | 8/2010 |
| JP | 2017197300 A | 11/2017 |

(Continued)

OTHER PUBLICATIONS

JP2017197300—Machine Translation (Year: 2017).*
European Search Report for European Patent Application No. 20166000 dated Sep. 10, 2020.

*Primary Examiner* — Michael A Riegelman
(74) *Attorney, Agent, or Firm* — Harness, Dickey & Pierce, P.L.C.

(57) ABSTRACT

The invention relates to a traction wheel for an elevator for driving plurality of belts, comprising a central axis; plurality of circular rim surfaces side by side in axial direction against each of which a belt can be placed to pass; and circular guide flanges on axial sides of each rim surface for guiding a belt placed to pass against the rim surface. Each of said guide flanges comprises a circular array of guide parts, plurality of which guide parts comprises a guide surface portion for guiding a belt, which guide surface portion is movable towards the central axis. The invention also relates to a drive machinery and an elevator implementing the traction wheel.

20 Claims, 7 Drawing Sheets

(56) References Cited

U.S. PATENT DOCUMENTS

| | | | | |
|---|---|---|---|---|
| 2014/0182976 A1* | 7/2014 | Valjus | ............... | B66B 7/062 |
| | | | | 187/254 |
| 2016/0046463 A1* | 2/2016 | Saarelainen | ......... | B66B 7/1215 |
| | | | | 187/254 |
| 2016/0236909 A1* | 8/2016 | Lampinen | ............... | B66B 15/04 |
| 2018/0162699 A1* | 6/2018 | Cambruzzi | ............ | B66B 15/02 |
| 2019/0375612 A1* | 12/2019 | Helenius | ................ | B66B 15/08 |
| 2020/0002132 A1* | 1/2020 | Mosher | ............... | D07B 1/0686 |
| 2020/0071134 A1* | 3/2020 | Helenius | ................ | B66B 15/04 |
| 2021/0300728 A1* | 9/2021 | Helenius | ................ | B66B 15/02 |

FOREIGN PATENT DOCUMENTS

| | | |
|---|---|---|
| SU | 1075042 A1 | 2/1984 |
| WO | WO-0014005 A2 | 3/2000 |
| WO | WO-2009/090299 A1 | 7/2009 |
| WO | WO-2016096726 A1 * | 6/2016 |

\* cited by examiner

ROPE WHEEL, TRACTION WHEEL, ELEVATOR DRIVE MACHINERY AND ELEVATOR

RELATED APPLICATIONS

This application claims priority to European Patent Application No. EP20166000.8 filed on Mar. 26, 2020, the entire contents of which are incorporated herein by reference.

FIELD OF THE INVENTION

The invention relates to a rope wheel, a traction wheel, an elevator drive machinery and an elevator. The elevator is preferably an elevator for transporting passengers and/or goods.

BACKGROUND OF THE INVENTION

Elevators typically comprise rope wheels, such as a traction wheel, and a roping comprising ropes connected with the elevator car and passing around the rope wheels. Via the ropes traction force can be transmitted from the traction wheel to the car. Car movement can be achieved by rotating the traction wheel. The traction wheel can be rotatable by an electric motor, for example.

The ropes driven by the traction wheel are typically suspension ropes which suspend the car and a counterweight on opposite sides of the traction wheel. An elevator can further comprise compensation ropes hanging from and connecting the car and a counterweight and passing around one or more rope wheels of a compensator mounted in the pit of a hoistway.

In elevators, the ropes may be belt-shaped. Position of a belt relative to a rope wheel, such as a traction wheel in the axial direction thereof should be maintained such that the belt does not drift in said axial direction away from the circular rim surface, here a traction surface, around and against which the belt in question is intended to pass. Guidance of passage of belts at the rope wheel may be needed.

Typically, in prior art, position of belts in the axial direction of a traction wheel has been controlled by providing the traction surfaces and the ropes passing against them with ribbed or toothed shapes complementary for each other, whereby movement of the belt in said axial direction is blocked by mechanical shape-locking. One alternative way to control position of the belts in said axial direction is to shape the traction surfaces of the traction wheel cambered. Each cambered traction surface has a convex shape against the peak of which the rope rests. The cambered shape tends to keep the belt-shaped rope passing around it to be positioned such that it rests against the peak thereof, thereby resisting displacement of the rope far away from the point of the peak.

An option has been to guide the belts by a guide flange on opposite axial sides of each traction surface for blocking movement of the belt axially away from the traction surface.

A drawback of the known solutions utilizing a flange has been that if the belt meets the flange, it may start climbing against the flange. It has been discovered that this climbing will cause additional tension at the belt edge that leans on the flange which is prone to increase the tendency of the belt to move axially even further from the traction surface. Thus, the flange may be unable to urge it back towards the traction surface. The climbing, and the leaning of the belt against the flange per se, are also harmful for the reason that they cause chafing, unintended bending, and high point-like pressure which are each likely to cause wear and damage to the belt.

Elevators having (on purpose or unintentionally) some fleet angle, i.e. when the belt arrives to or leaves from the traction wheel in a direction that is not completely orthogonal to the axis of the traction wheel, are particularly likely to face problems with the climbing when a flange is used for rope guidance. Also, elevators where there exists rope twist, are particularly likely to face problems with the climbing when a flange is used for rope guidance. Also, elevators where the traction surface has no positive guiding means, such as a shape locking engagement between the belt and the traction surface, are particularly likely to face problems with the climbing when a flange is used for rope guidance.

Elevators also have other rope wheels than a traction wheel, where drawbacks as described can be present. Rope wheels, such as freely rotating rope wheels of a compensator, or freely rotating rope wheels installed in an elevator system merely for the purpose of guiding passage of the belts can have the drawbacks as described.

BRIEF DESCRIPTION OF THE INVENTION

The object of the invention is to provide a solution which is improved in terms of guidance of belts of an elevator. An object is particularly to alleviate one or more of the above defined drawbacks of prior art and/or problems discussed or implied elsewhere in the description. Solutions are presented, inter alia, by which in an elevator a belt can be guided on a rope wheel by flanges with improved ability to resist and reduce belt climbing and problems caused by it. Solutions are presented, inter alia, by which guidance of the belt can be realized so that fleet angle and/or belt twist in the rope configuration can exist, either intentionally or unintentionally, without problems caused by belt climbing.

It is brought forward a new rope wheel for an elevator, comprising a central axis x; a circular rim surface or plurality of circular rim surfaces, in particular side by side in axial direction (i.e. in direction of said axis x). Against and around of each said rim surface a belt can be placed to pass. The rope wheel further comprises circular guide flanges on axial sides of each said rim surface for guiding a belt placed to pass against and around the rim surface. Each of said guide flanges comprises a circular array of guide parts, plurality of which guide parts are movable and comprising a guide surface portion for guiding a belt, which guide surface portion is movable towards the central axis.

With this solution, one or more of the above mentioned advantages and/or objectives are achieved. Movability of the guide surface portion towards the central axis x, inter alia, facilitates that the flanges can efficiently block axial displacement of the belt away from the rim surface since movability of the guide surface portions towards the central axis x reduces belt tension at the belt edge that leans radially on the flange in a case where some climbing has already occurred.

Preferable further features are introduced in the following, which further features can be combined with the rope wheel individually or in any combination. The preferable further features introduced in the following facilitate achievement of one or more of the above mentioned advantages and/or objectives.

In a preferred embodiment, the rope wheel is a traction wheel for driving plurality of belts and comprising plurality of said circular rim surfaces side by side in axial direction against and around each of which a belt can be placed to pass.

In a preferred embodiment, each said guide part forms a part of a flank of the flange.

In a preferred embodiment, each said guide surface portion faces directly or at an angle towards the axial direction x, wherein said angle is particularly smaller than 90 degrees, preferably smaller than 45 degrees, more preferably smaller than 30 degrees.

In a preferred embodiment, each said rim surface and guide surface portions of the flanges disposed on axial sides of the said rim surface border a radially open groove for receiving a belt. Then, in particular the rim surface forms at least partially the bottom surface of the guide groove and the guide surface portions form at least partially the flank surfaces of the guide groove.

In a preferred embodiment, each said guide surface portion is suitable for contacting a belt in particular when the belt has moved axially (i.e. in axial direction x) outwards from the rim surface.

In a preferred embodiment, each said movable guide part is movable, preferably slidably or rotatably, such that the guide surface portion thereof moves towards the central axis x.

In a preferred embodiment, each said movable guide part is mounted movably on a body of the traction wheel, in particular such that the guide surface portion thereof is movable towards the central axis x. The body preferably consists of a single body part or plurality of body parts immovably fixed together.

In a preferred embodiment, each said movable guide part is arranged to move under a radial force exerted on the guide surface portion, in particular by a belt displaced from the rim surface, such that the guide surface portion thereof moves towards the central axis x.

In a preferred embodiment, each said guide part is slidably movable. This provides movability for a guide surface portion simply. Movement direction can also be simply controlled and resistance by spring force can be simply provided when needed.

In a preferred embodiment, each said guide part is movable back and forth, in particular towards the central axis x and back outwards from the central axis x.

In a preferred embodiment, each said guide part is supported by a slide surface against which the guide part can slide back and forth, in particular towards the central axis x and back outwards from the central axis x.

In a preferred embodiment, each said movable guide part is movable against a spring force such that the guide surface portion moves towards the central axis x. Then, preferably the spring force is arranged to urge the guide part which has been displaced towards the central axis x to return back outwards from the central axis x. Thus, when the belt moves out of contact with the guide part movable as defined, the guide part is arranged to return to an initial position from which it can again move towards the central axis x, when needed.

In a preferred embodiment, the traction wheel comprises one or more springs for resisting movement of the movable guide parts towards the central axis x.

In a preferred embodiment, each said movable guide part is mounted on a body of the traction wheel via one or more springs, in particular such that movement of the movable guide part towards the central axis x is resisted by the one or more springs.

In a preferred embodiment, the guide part is arranged to force the spring to elastically deform, e.g. twist, bend or compress, when the guide part is moved towards the central axis x.

In a preferred embodiment, the spring is a coil spring.

In a preferred embodiment, the spring is arranged to operate as a torsion spring.

In a preferred embodiment, each said guide part is movable along a linear path.

In a preferred embodiment, each said guide surface portion is movable (also) back outwards from the central axis x, in particular after it has moved towards the central axis. Then preferably each said movable guide part is movable (also) such that the guide surface portion thereof moves away from the central axis x.

In a preferred embodiment, each said guide surface portion extends radially farther away from the central axis x than the rim surfaces or rim surfaces, respectively. Thereby each of them forms an obstacle with which a belt collides if displaced from a rim surface in axial direction.

In a preferred embodiment, each said movable guide part is rotatably movable. This provides movability for a guide surface portion simply. Rotatability is simple to provide such that small amount of wear and malfunctions appear in long term use.

In a preferred embodiment, each said movable guide part is rotatably movable, the rotation axis of the guide part extending in tangential or at least substantially tangential direction of the traction wheel.

In a preferred embodiment, each said movable guide part is a roller the rim of which comprises said guide surface portion that is movable towards the central axis.

In a preferred embodiment, the tangential projection of each said circular rim surface is parallel with the central axis x. This is advantageous, since hereby the belt can pass against and around the circular rim surface without deformation, such as bending deformation caused by cambering for example. Additional deformation would cause additional tension and form an additional cause of damage for the load bearing members and/or coating of the belt. This is particularly advantageous in context of belts, which comprise brittle load bearing members, such as load bearing members comprising composite material and/or a coating. Moreover, the circular rim surface is then extremely simple to manufacture. In this context, the guidance by flanges as described is particularly advantageous since hereby well working guidance can be provided even though the shape of the tangential projection is parallel with the central axis x.

It is also brought forward a new drive machinery for an elevator comprising a rotatable rope wheel as defined anywhere above, wherein the rope wheel is a traction wheel. Each said circular rim surface then particularly serves as a circular traction surface for transmitting traction to a belt placed to pass against and around the circular traction surface in question.

With this solution, one or more of the above mentioned advantages and/or objectives are achieved.

Preferable further features are introduced in the following, which further features can be combined with the drive machinery individually or in any combination.

In a preferred embodiment, the drive machinery comprises a motor for rotating the traction wheel. The body of the traction wheel is preferably fixedly connected with a rotor of the motor.

It is also brought forwards a new elevator comprising a rope wheel or a drive machinery as defined anywhere above.

With this solution, one or more of the above mentioned advantages and/or objectives are achieved.

Preferable further features are introduced in the following, which further features can be combined with the elevator individually or in any combination.

In a preferred embodiment, the rope wheel is a traction wheel.

In a preferred embodiment, the drive machinery is arranged to drive plurality of belts placed to pass against the circular rim surfaces of the traction wheel.

In a preferred embodiment, the elevator comprises an elevator car, and said plurality of belts are connected to the elevator car.

In a preferred embodiment, the elevator comprises an elevator car, and said plurality of belts suspend the elevator car.

In a preferred embodiment, each said belt is placed to pass against and around the rim surface without shape locking between the belt and the rim surface. In this context, the guidance by flanges as described is particularly advantageous since hereby well working guidance can be provided by the flanges, and the rim surfaces and the belt surfaces can be manufactured simply and without need for shape locking features.

In a preferred embodiment, each said belt comprises a flat side surface placed to pass against and around a rim surface of the rope wheel.

In a preferred embodiment, the rim surfaces engage the belts frictionally without shape locking between the belt and the rim surface.

In a preferred embodiment, the width of the rim surface as measured in direction of said central axis is at least equal to or greater than the width of the belt as measured in direction of said central axis x.

In a preferred embodiment, the width of each rim surface as measured in direction of said central axis x is less than 2 times, more preferably less than 1.5 times, most preferably less than 1.2 times the width of the belt placed to pass against it as measured in direction of said central axis x. The rim surface can be designed advantageously slim owing to the guidance by flanges as described since this guidance effectively and reliably reduces escaping of the belt from the rim surface. Most considerable improvements on the slimness of the rim surface can be achieved in context where no shape locking exists between the rim surfaces and the belt surfaces, because conventionally in this type of solutions (e.g. with cambered rim surfaces), each rim surface has been very wide, even many times wider that the belt.

In a preferred embodiment, neither of the rim surface and the belt placed to pass against and around it has protrusions, such as longitudinal ribs or transverse ribs e.g. teeth for example, extending into a recess of the other. In this context, the guidance by flanges as described is particularly advantageous since hereby well working guidance can be provided by the flanges, and the rim surfaces and the belt surfaces are can be manufactured simply and without need for the aforementioned complicated shape locking features.

In a preferred embodiment, each said belt comprises one or more load bearing members extending in longitudinal direction of the belt throughout the length thereof.

In a preferred embodiment, each said belt comprises one or more load bearing members extending in longitudinal direction of the belt throughout the length thereof and embedded in a coating forming the outer surface of the belt. The coating, preferably comprises polymer material such as polyurethane for example, or alternatively rubber or silicone. The coating is in contact with the rim surface of the rope wheel.

In a preferred embodiment, each said load bearing member is non-metallic.

In a preferred embodiment, each said load bearing member is made of composite material comprising non-metallic reinforcing fibers embedded in polymer matrix, said reinforcing fibers preferably being carbon fibers or glass fibers.

In a preferred embodiment, the reinforcing fibers are distributed at least substantially evenly in polymer matrix and bound to each other by the polymer matrix.

In a preferred embodiment, the width/thickness ratio of the belt is more than two, preferably more than 4.

In a preferred embodiment, the reinforcing fibers are not twisted together. Instead, it is preferable that the reinforcing fibers of each load bearing member are parallel with the longitudinal direction of the load bearing member. Thereby the fibers are also parallel with the longitudinal direction of the rope as each load bearing member is oriented parallel with the longitudinal direction of the belt. This facilitates further the longitudinal stiffness of the belt.

In a preferred embodiment, the polymer matrix is so hard that its module of elasticity (E) is over 2 GPa, most preferably over 2.5 GPa. In this case the module of elasticity E is preferably in the range 2.5-10 GPa, most preferably in the range 2.5-4.5 GPa.

In a preferred embodiment, said rope wheel is a freely rotating rope wheel.

In a preferred embodiment, the elevator comprises a compensator and said rope wheel is a rope wheel of said compensator for guiding compensation ropes of the elevator. Preferably, the compensator comprises a frame on which the rope wheel is mounted. The frame is preferably vertically movable a movement range, the range preferably being guided by guide rails and delimited in length by stoppers for blocking movement of the frame, in particular a first stopper for blocking movement of the frame above a first limit and a second stopper for blocking movement of the frame below a second limit. A tensioning weight is preferably mounted on the frame for tensioning the ropes guided by the rope wheels of the compensator. The compensator is preferably mounted on the bottom floor of the elevator hoistway.

In a preferred embodiment, an angle of contact between each belt and the rim surface against and around which the belt is placed to pass is substantially less than 180 degrees, preferably less than 135 degrees, preferably 90 degrees or even less than 90 degrees. In this context, the advantages of the guidance as described are particularly considerable.

The elevator is in general preferably such that the elevator car thereof is vertically movable to and from plurality of landings, i.e. two or more vertically displaced landings. Preferably, the elevator car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
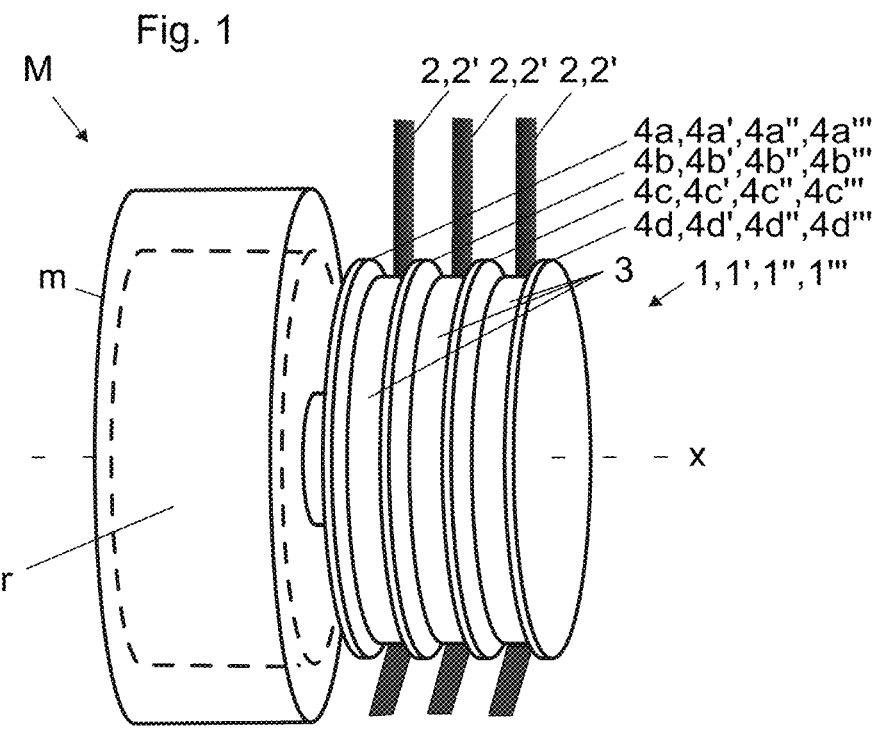
FIG. 1 illustrates schematically a drive machinery for an elevator according to an embodiment and a rope wheel according to an embodiment.

FIG. 1 illustrates a rotatable rope wheel 1;1';1";1"', which is comprised in a drive machinery M for an elevator. The rope wheel 1;1';1";1"' is here a traction wheel for driving plurality of belt-shaped ropes 2,2' of the elevator, the rope wheel 1;1';1";1"' comprising a central axis x and plurality of circular rim surfaces 3 (also referred to as rim surfaces), which are in axial direction x side by side and against and around each of which a belt 2,2' can be placed to pass. The traction drive wheel 1;1';1";1"' comprises circular guide flanges 4a-4a''',4b-4b''',4c-4c''',4d-4d''' on axial sides of each rim surface 3 for guiding a belt 2,2' placed to pass against and around the rim surface 3. For example, the traction drive wheel 1;1';1";1"' comprises circular guide flanges 4b-4b''' and 4c-4c''' on axial sides of the rim surface 3 against and around which the centremost belt 2,2' is placed to pass.

The rope wheel 1;1';1";1"' can be arranged to transmit traction (force) via the circular rim surfaces 3 on the belts 2,2' placed to pass against and around them, as it is the case in FIG. 1.

The drive machinery M moreover comprises a motor m arranged to rotate the traction wheel 1;1';1";1"'. The motor m is preferably an electric motor. The body (8a,8b;8 as will be later described further) of the traction wheel 1;1';1";1"' is preferably fixedly connected with a rotor r of the motor.

Each said guide flange 4a-4d comprises a circular array of guide parts 5,5',5",5"', plurality of which (here all) all movable guide parts 5,5',5",5"' comprising a guide surface portion 5a,5a',5a",5a' for guiding a belt 2,2', which guide surface portion 5a,5a',5a",5'" is movable towards the central axis x. Preferred further details will be described and illustrated referring to the preferred embodiments of FIGS. 2-15.

In the following preferred details of a first, second and third embodiments are described referring to FIGS. 2-15.

Figure 2:
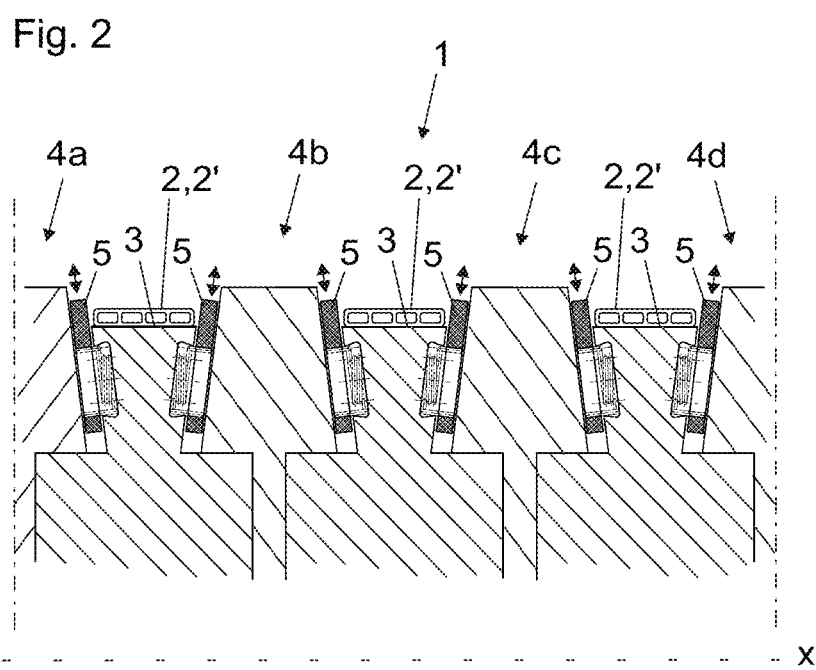
FIG. 2 illustrates partially a cross sectional view of a rope wheel according to a first preferred embodiment as seen in tangential direction of the rope wheel.
Figure 6:
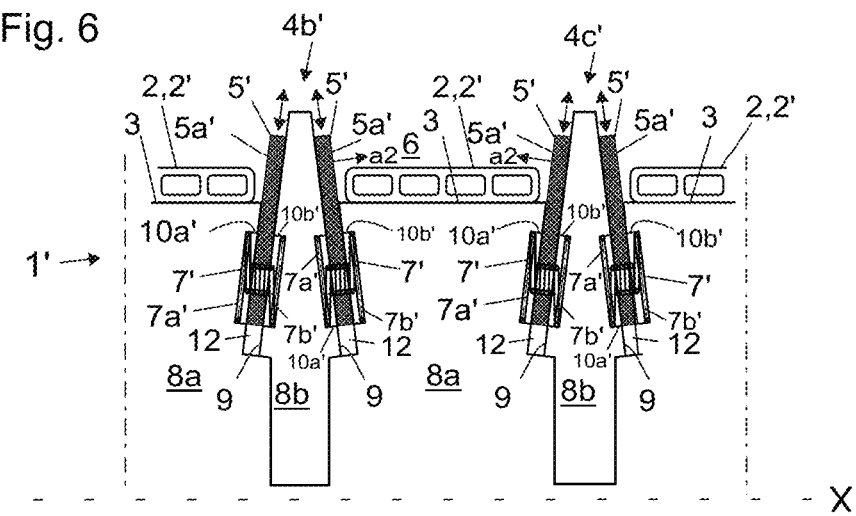
FIG. 6 illustrates partially a cross sectional view of the rope wheel according to a second preferred embodiment as seen in tangential direction of the rope wheel.
Figure 7:
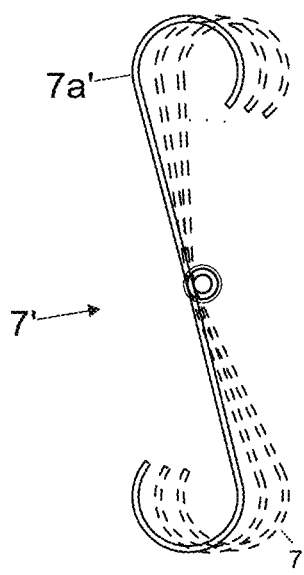
FIGS. 7-9 illustrate preferred details of the embodiment of FIG. 6.
Figure 8:
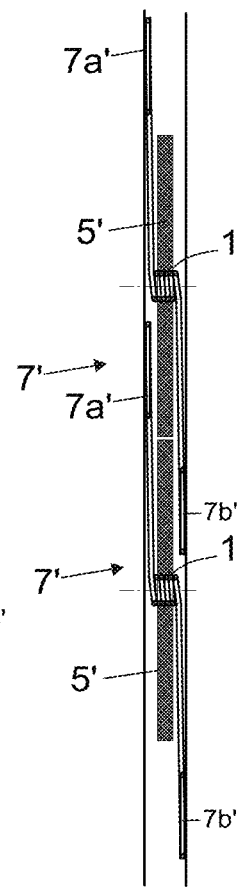
Figure 9:
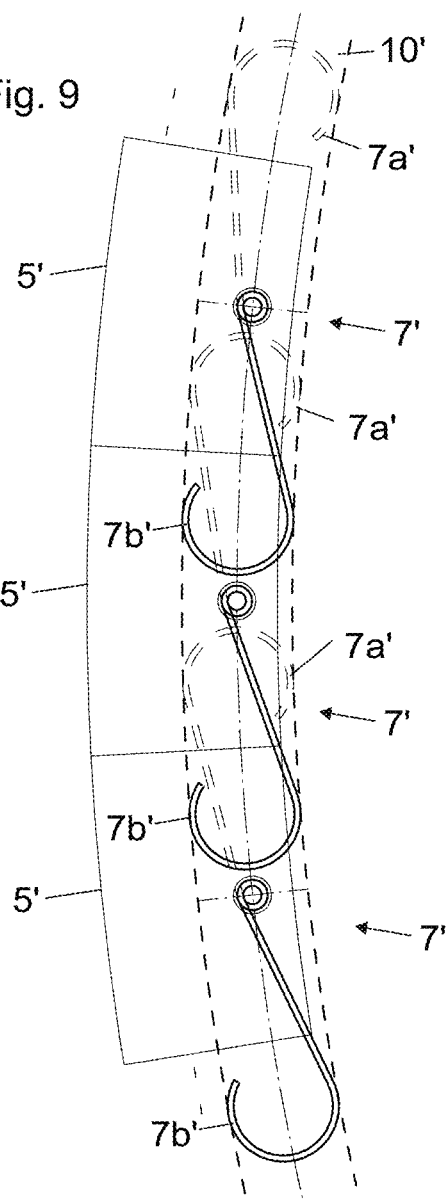
Figure 10:
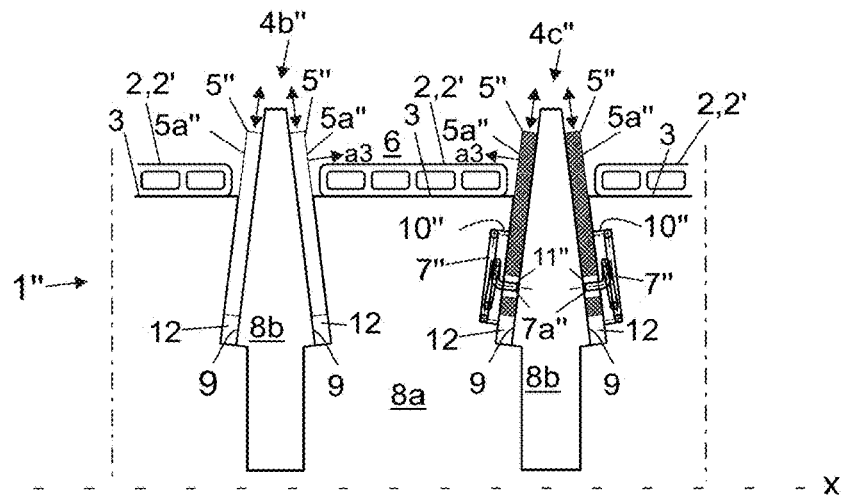
FIG. 10 illustrates partially a cross sectional view of the rope wheel according to a third preferred embodiment as seen in tangential direction of the rope wheel.

FIGS. 2, 6 and 10 illustrate partially a cross sectional view of the rope wheel 1,1',1" according to a first, second and third, respectively, as well as belts 2,2' placed to pass against and around the rim surface 3 of the rope wheel 1,1',1".

In these embodiments, each guide flange 4a-4d;4a'-4d'; 4a"-4d" comprises a circular array of guide parts 5;5';5", plurality of which guide parts 5;5';5" comprises a guide surface portion 5a,5a',5a" for guiding a belt 2,2', which guide surface portion 5a,5a',5a" is movable towards the central axis x. Each said guide part 5;5';5" forms a part of a flank of the flange 4a-4d;4a'-4d'; 4a"-4d". Each said guide surface portion 5a,5a',5a" is suitable for contacting a belt 2,2' in particular when moved axially outwards from the rim surface 3.

Each said guide part 5;5';5" extends radially farther away from the central axis x than the guide rim surface 3 thereby forming an obstacle with which a belt 2,2' collides if displaced from the rim surface 3 in axial direction.

Each said guide surface portion 5a,5a',5a" faces towards the axial direction x. Preferably, in particular a normal vector (arrows a1;a2;a3 illustrated in Figures) of the guide surface portion 5a,5a',5a" points at an angle in the axial direction x, wherein the angle is smaller than 90 degrees preferably smaller than 45 degrees, more preferably smaller than 30 degrees. The guide surface portion 5a,5a',5a" faces in this embodiment at an angle towards the axial direction x but optionally it could face directly towards the axial direction x. The guide surface portion 5a,5a',5a" is in this embodiment planar, but optionally it could be curved. A relatively small angle between the axial direction x and the normal vector provides an efficient blockage against wandering of the belt 2,2' without an excessive likelihood of producing a strong radial force component on the belt with the surface portion 5a,5a',5a" in question.

Each rim surface 3 and guide surface portions 5a,5a',5a" of the flanges disposed on axial sides of said rim surface 3 border a radially open groove 6 for receiving a belt 2,2'. Thus, movement of the belt 2,2' axially away from the rim surface 3 in both axial directions is blocked by a flange.

Movability of the guide surface portion 5a,5a',5a" towards the central axis x facilitates that the flanges 4a-4d; 4a'-4d';4a"-4d" can efficiently block axial movement of the belt away from the rim surface 3 since movability of the guide surface portions 5a,5a',5a" towards the central axis x reduces belt tension at the belt edge that leans radially on the flange in a case where some climbing has already occurred. Said tension is prone to increase the tendency of the belt to move axially even further from the rim surface, whereby reduction thereof is advantageous when aiming to urge the belt 2,2' axially back towards it intended position. An advantage is also that chafing between the rope wheel and the belt 2,2' arriving at the rope wheel 1 can be reduced.

Movability of the guide surface portion 5a,5a',5a" towards the central axis x is provided such that each said movable guide part 5,5',5" is movable such that the guide surface portion 5a-5d;5a'-5d';4a"-5d" moves towards the central axis x. In particular, each said guide part 5;5';5" is arranged to displace under a radial force exerted on the guide surface portion 5a,5a',5a", in particular by a belt 2,2' displaced from the rim surface 3, such that the guide surface portion 5a,5a',5a" moves towards the central axis x.

In the preferred embodiments of FIGS. 2-12, each said guide part 5;5';5" (also referred to as a movable guide part) is movable against a spring force such that the guide surface portion 5a;5a';5a" moves towards the central axis x. The spring force is arranged to urge the guide part 5;5';5", which has been displaced towards the central axis x, to return back outwards from the central axis x. Thus, when the belt moves out of contact with the guide part 5;5';5", the guide part is arranged to return to an initial position from which it can again move towards the central axis x, when contacted by a belt 2,2'.

The rope wheel comprises one or more springs 7-7" for resisting movement of the guide parts 5-5'" towards the central axis x. In the preferred embodiment of FIGS. 2-12, the guide parts 5;5';5" are mounted on a body 8 of the rope wheel 1 via springs, in particular such that movement of each guide part 5;5';5" towards the central axis x is resisted by a spring 7-7". By the springs 7-7", the aforementioned spring force can be provided.

A part of each said guide part 5;5';5" is mounted at least partially within a slit 12 such that it can be moved in the slit 12 towards the central axis x as well as to return back outwards from the central axis x.

Figure 3:
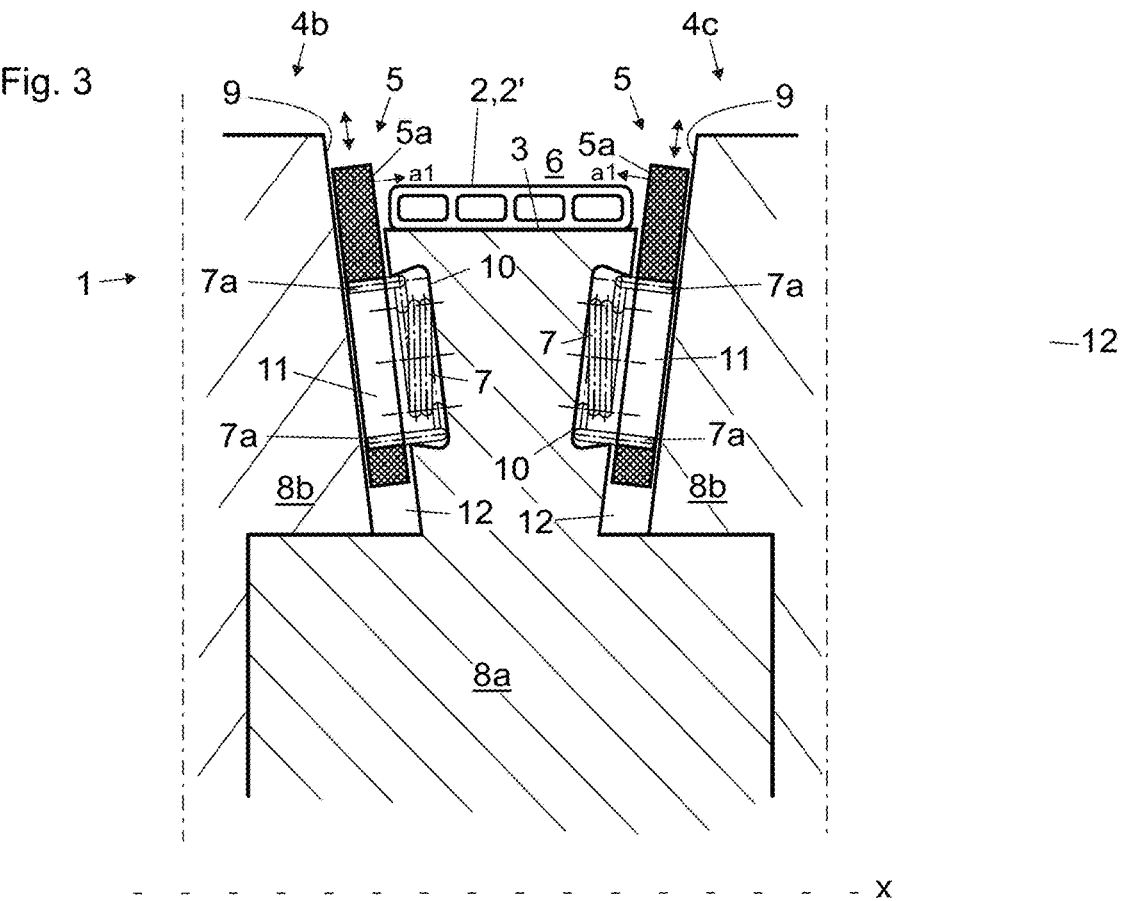
FIGS. 3-5 illustrate preferred details of the embodiment of FIG. 2.
Figure 4:
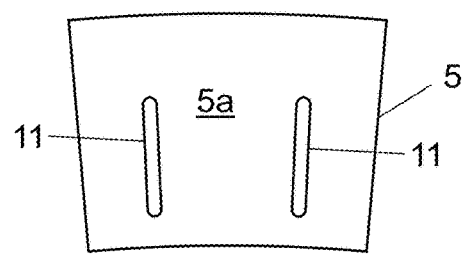

Each said guide part 5;5';5" is supported by a slide surface 9 against which the guide part 5;5';5" can slide back and forth, in particular towards the central axis x and back outwards from the central axis x. In the preferred embodiments, the slide surface 9 at least partially forms the wall surface of the aforementioned slit 12. The guide part 5;5';5" is preferably a plate as illustrated in FIGS. 3 and 4, whereby it is simple to manufacture, as well as easy to make slidable against a planar a slide surface 9. In the preferred embodiments of FIGS. 2-12, each said guide part 5 is movable along a linear path.

In the first preferred embodiment of FIGS. 2-5, the guide parts 5 are mounted movably on a body 8a,8b of the rope wheel 1 via springs 7. Each spring 7 is inserted in a recess 10 formed in the body 8, which recess 10 is open towards the axial direction x. In this embodiment, the spring 7 is a coil spring shape-locked into the recess 10 and having an end part 7a extending out from the recess 10 and into a recess 11 of the guide parts 5, an edge of the recess 11 of the guide part being arranged to push, when the guide part 5 is moved towards the central axis x, the end part 7a such that the spring 7 elastically deforms, in this embodiment particular twists around an axis around which the coiled section of the coil spring spirals. Thus, the guide part 5 is arranged to force the spring 7 to elastically deform, in particularly twist, when the guide part 5 is moved towards the central axis x. The spring 7 is thereby in the present embodiment arranged to operate as a torsion spring. The elastic deformation may include, in addition to twisting or as an alternative to it, bending of the end part 7a, whereby it can be then regarded that the spring 7 is arranged to operate as a bending spring. The elastic deformation produces a spring force that urges the guide part 5 which has been moved towards the central axis x to return back outwards from the central axis x. This kind of ability of the guide part 5 to move towards the central axis x allows the belt edge that has climbed against the flange to return back towards the central axis x when the forces exerted by the tensioned belt on the guide part 5 exceed the spring force. This returning provides that the additional tension caused by the climbing is eliminated and the tendency of the belt to move axially even further from the rim surface can be reduced.

Figure 5:
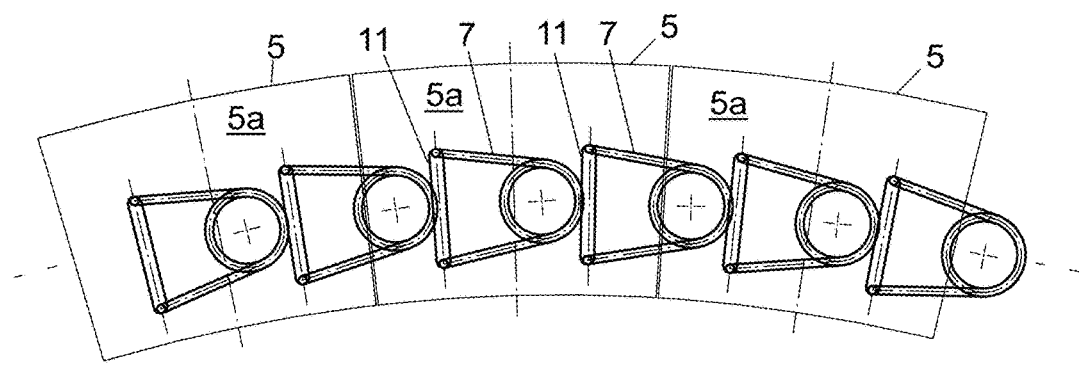

As illustrated in FIGS. 4 and 5, it is preferable, although not necessary, that each guide part 5 is mounted on the body 8a,8b of the rope wheel 1 via two springs 7 inserted in a recess 10 formed in the body 8a,8b. For this purpose, the guide part 5 has two of said recesses 11 into which recesses 11 end parts 7a of different springs 7 extend.

In the second preferred embodiment of FIGS. 6-9, the guide parts 5' are mounted on a body 8a,8b' of the rope wheel 1 via springs 7'. Each spring 7' is inserted in an opening 11' formed in the guide part 5', which opening 11' is open in the axial direction x in opposite directions. In this embodiment, the spring 7' is a coil spring shape-locked into the opening 11'. Particularly, the coiled section of the spring 7' is inserted in said opening 11'. The spring 7' comprises an end part 7a' protruding from the coiled section and extending into a first recess 10a' of a body 8a,8b' of the tractions sheave 1 which recess is on the first axial side of the spring 7', and an end part 7b' protruding from the coiled section and extending into a second recess 10b' of a body 8a,8b' of the tractions sheave 1 which recess 10b' is on the second axial side of the spring 7'.

An edge of the opening 11' of the guide part 5' is arranged to push, when the guide part 5' is moved towards the central axis x, the end part 7a' against the recess 10a' and the end part 7b' against the recess 10b' such that the spring 7' elastically deforms, in this embodiment particular twists around an axis around which the coiled section of the coil spring spirals. Thus, the guide part 5' is arranged to force the spring 7' to elastically deform, in particularly twist, when the guide part 5' is moved towards the central axis x. The spring 7' is thereby in the present embodiment arranged to operate as a torsion spring. The elastic deformation may include, in addition to twisting or as an alternative to it, bending of the end part 7a' and/or 7b', whereby it can be then regarded that the spring 7' is arranged to operate as a bending spring. The elastic deformation produces a spring force that urges the guide part 5' which has been moved towards the central axis x to return back outwards from the central axis x. This kind of ability of the guide part 5' to move towards the central axis x allows the belt edge that has climbed against the flange to return back towards the central axis x when the forces exerted by the tensioned belt on the guide part 5' exceed the spring force. This returning provides that the additional tension caused by the climbing is eliminated and the tendency of the belt to move axially even further from the rim surface can be reduced.

In the embodiments of FIGS. 2-12, the body 8a,8b consists of plurality of body parts 8a and 8b immovably fixed together. The body parts 8a and 8b preferably form at least partially the wall surfaces of the aforementioned slit 12. This is preferable, although not necessary, since when the body consists of plurality of body parts 8a and 8b manufacturing, in particular assembly, of the rope wheel 1 can facilitated. For example, the body 8a,8b and springs can be simply assembled together.

Figure 11:
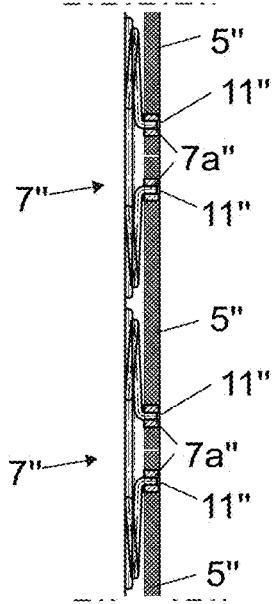
FIGS. 11-12 illustrate preferred details of the embodiment of FIG. 10.
Figure 12:
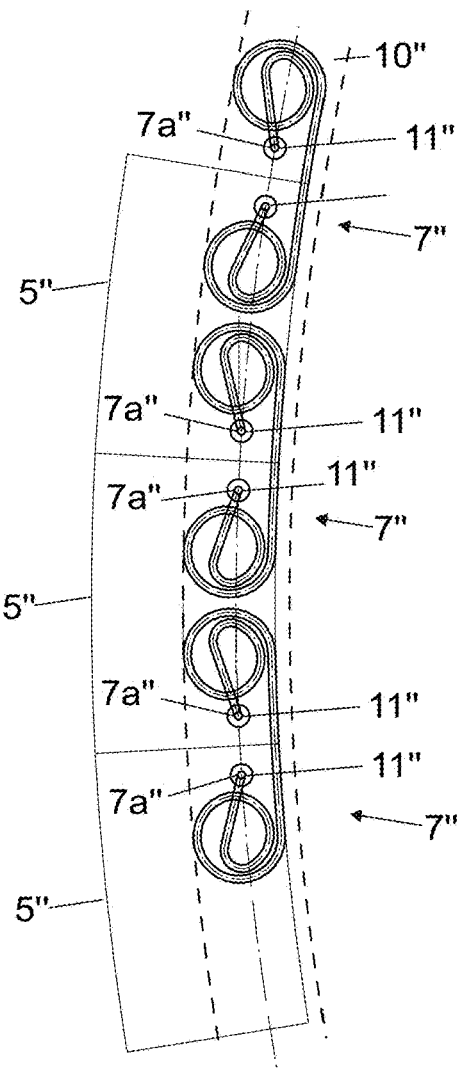

In the third preferred embodiment of FIGS. 10-12, the guide parts 5" are mounted on a body 8a,8b of the rope wheel 1 via springs 7". Each spring 7" is inserted in a recess 10" formed in the body 8a,8b, which recess 10" is open towards the axial direction x. In this embodiment, the spring 7" is a coil spring shape-locked into the recess 10" and has an end part 7a" extending out from the recess 10" and into a recess 11" of the guide part 5", an edge of the recess 11" of the guide part being arranged to push, when the guide part 5" is moved towards the central axis x, the end part 7a" such that the spring 7" elastically deforms, in this embodiment particular twists around an axis around which the coiled section of the coil spring spirals. Thus, the guide part is arranged to force the spring 7" to elastically deform, in particularly twist, when the guide part 5" is moved towards the central axis x. The spring 7" is thereby in the present embodiment arranged to operate as a torsion spring". The elastic deformation may include, in addition to twisting or as an alternative to it, bending of the end part 7a" and/or 7b", whereby it can be then regarded that the spring 7" is arranged to operate as a bending spring. The elastic deformation produces a spring force that urges the guide part 5" which has been moved towards the central axis x to return back outwards from the central axis x. This kind of ability of the guide part 5" to move towards the central axis x allows the belt edge that has climbed against the flange to return back towards the central axis x when the forces exerted by the tensioned belt on the guide part 5" exceed the spring force. This returning provides that the additional tension caused by the climbing is eliminated and the tendency of the belt to move axially even further from the rim surface can be reduced.

As illustrated in FIGS. 11 and 12, it is preferable, although not necessary, that the spring 7" comprises two coiled sections parallel to each other such that their axes around which they spiral are parallel and at a distance from each other in circumferential direction of the rope wheel 1, an end part 7a protruding from each of them, the end parts 7a of the same spring 7" being arranged to extend into recesses 11" of adjacent guide parts 5".

As illustrated in FIGS. 11 and 12, it is preferable, although not necessary, that each guide part 5" is mounted on the body 8a,8b of the rope wheel 1 via two of said springs 7" each inserted in a recess 10" formed in the body 8a,8b. For this purpose, the guide part 5" has two of said recesses 11" into which recesses 11" end parts 7a" of different springs 7" extend.

In the following preferred details of the fourth embodiment are described referring to FIGS. 13-15.

Figure 13:
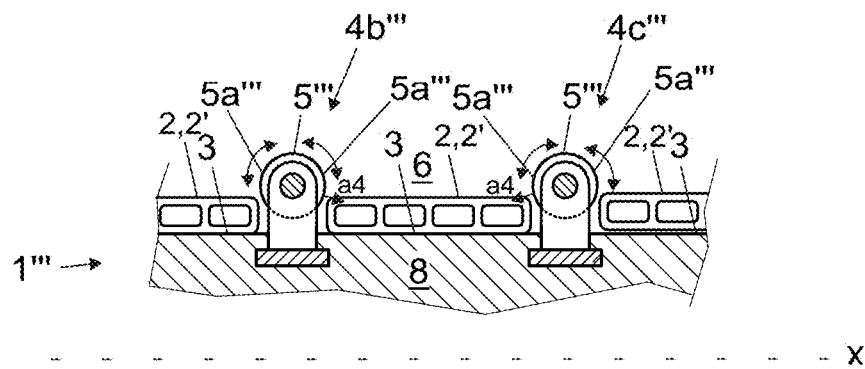
FIG. 13 illustrates partially a cross sectional view of the rope wheel according to a fourth preferred embodiment.

FIG. 13 illustrates partially a cross sectional view of the rope wheel 1''' according to the fourth embodiment, as well as belts 2,2' placed to pass against the rim surfaces 3 of the rope wheel 1'''.

Each guide flange 4a'''-4d''' comprises a circular array of guide parts 5''', plurality of which guide parts 5''' comprises a guide surface portion 5a''' for guiding a belt 2,2', which guide surface portion 5a''' is movable towards the central axis x. Each said guide part 5''' forms a part of a flank of the flange 4a'''-4d'''. Each said guide surface portion 5''' is suitable for contacting a belt 2,2' in particular when the belt 2,2' has moved axially (i.e. in axial direction x) outwards from the rim surface 3.

Each said guide part 5''' extends radially farther away from the central axis x than the guide rim surface 3 thereby forming an obstacle with which a belt 2,2' collides if moved from the rim surface 3 in axial direction.

In this embodiment each said movable guide part 5''' is rotatably moveable, in particular such that a guide surface portion 5a''' thereof moves towards the central axis x. For this purpose, each said guide part 5''' is a rotatably mounted part comprising said guide surface portion 5a''', in particular a roller the rim of which comprises said guide surface portion 5a'''. The rotation axis of the movable guide part 5''' preferably extends in tangential or at least substantially tangential direction of the rope wheel 1'''.

Each said guide surface portion 5a''' faces towards the axial direction x. The guide part 5''' is a roller, and it comprises a circular rim of which said guide surface portion 5a''' forms part of. A normal vector (arrow a4 illustrated in Figures) of the guide surface portion 5a''' points at an angle in the axial direction x, wherein the angle (i.e. the angle between axial direction x and the vector a4) is smaller than 90 degrees preferably smaller than 45 degrees, more preferably smaller than 30 degrees. The guide surface portion 5a''', where normal vector has been drawn, faces in this embodiment at an angle towards the axial direction x but optionally it could face directly towards the axial direction x. A relatively small angle between the axial direction x and the normal vector provides an efficient blockage against wandering of the belt 2,2' without an excessive likelihood of producing a strong radial force component on the belt with the surface portion 5a''' in question.

Each rim surface 3 and guide surface portions 5a''' of the flanges 4a''',4b'''; 4b''',4c'''; 4c''',4d'''; disposed on axial sides of said rim surface 3 border a radially open groove 6 for receiving a belt 2,2'. Thus, movement of the belt 2,2' axially away from the rim surface 3 in both axial directions is blocked by a flange.

Movability of the guide surface portion 5a''' towards the central axis x facilitates that the flanges 4a'''-4d''' can efficiently block axial movement of the belt away from the rim surface 3 since movability of the guide surface portions 5a''' towards the central axis x reduces belt tension at the belt edge that leans radially on the flange in a case where some climbing has already occurred. Said tension is prone to increase the tendency of the belt to move axially even further from the rim surface, whereby reduction thereof is advantageous when aiming to urge the belt 2,2' axially back towards it intended position. An advantage is also that chafing between the rope wheel and the belt 2,2' arriving at the rope wheel 1 can be reduced.

Movability of the guide surface portion 5a''' towards the central axis x is provided such that each said guide part 5''' is moveable such that the guide surface portion 5a''' moves towards the central axis x. In particular, each said guide part 5''' is arranged to move under a radial force (i.e. a force component oriented in radial direction towards axis x) exerted on the guide surface portion 5a''', in particular by a belt 2,2' displaced from the rim surface 3, such that the guide surface portion 5a''' moves towards the central axis x.

Figure 14:
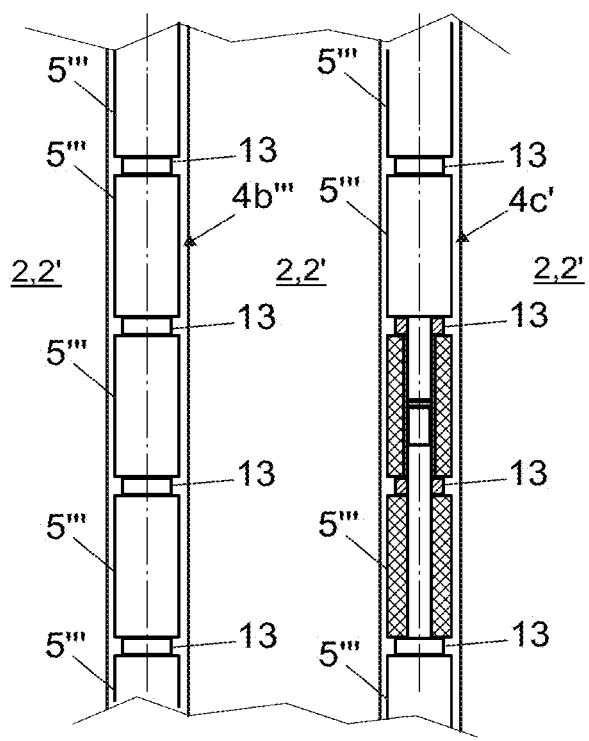
FIGS. 14-15 illustrate preferred details of the embodiment of FIG. 13.
Figure 15:
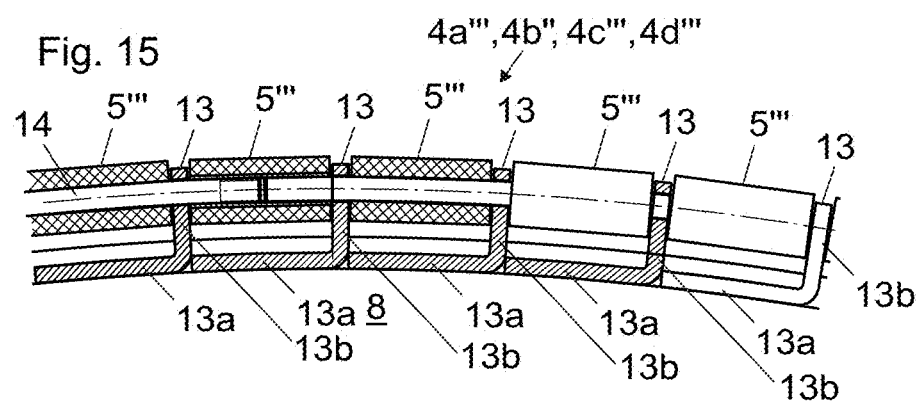

In the preferred embodiments of FIGS. 13-15, each said guide part 5''' (also referred to as a moveable guide part) of the flanges 4b''' and 4c''' (also referred to as intermediate flanges), which are not the outermost flanges but have a rim surface on both axial sides thereof, forms a part of opposite flanks of the flange 4a'''-4d'''. Thus, each said guide part 5''' of the intermediate flanges can comprise guide surface portions 5a''' that border different radially open grooves 6 for receiving a belt 2,2'.

Each said roller 5''' is preferably a freely rotating roller. Each said roller 5''' is preferably a roller rotatable in two directions. Thus, it is moveable such that the guide surface portion 5a''' moves towards the central axis x, but preferably also such that the guide surface portion 5a''' moves outwards from the central axis x. This facilitates that the belt 2,2' can leave the groove 6 without chafing also when in reaches to contact the roller 5'''.

In the preferred embodiment of FIGS. 13-15, the movable guide parts 5''' are mounted on a body 8 of the rope wheel 1''' via brackets 13. The guide parts 5''' are rotatably supported on the brackets 13 via and at least one shaft 14. In the preferred embodiment illustrated, there is one shaft extending through all the guide parts 5''' and supported by plurality of brackets 13. The brackets are bent plate members comprising a portion 13a fixed on the body 8 and an portion 13b protruding from the portion 13a and extending between successive guide parts 5''', each portion 13b comprising an opening through which the shaft 14 extends.

Figure 16:
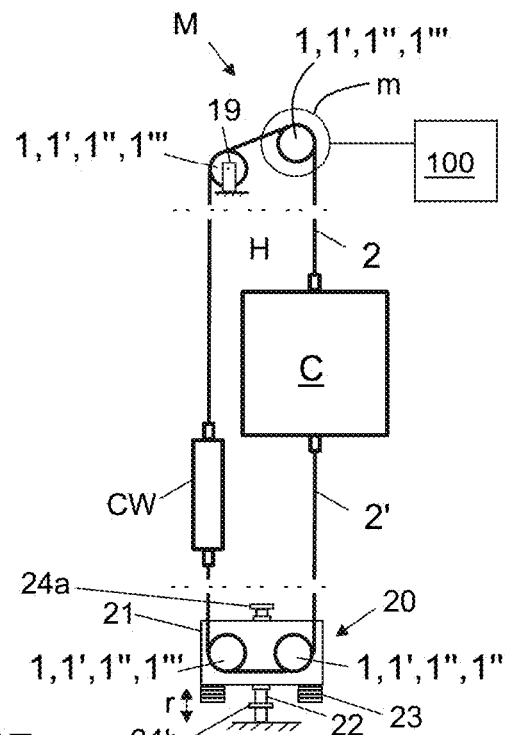
FIG. 16 illustrates an embodiment of an elevator implementing the drive machinery and the rope wheel according to FIG. 1.

FIG. 16 illustrates an elevator according to an embodiment. The elevator comprises a drive machinery M comprising a rope wheel 1,1',1",1''' as described referring to any of the FIGS. 1-15. The rope wheel is here a traction wheel 1,1',1",1''' arranged to drive plurality of belts 2 placed to pass against and around the rim surfaces 3 of the rope wheel 1,1',1",1'''. The drive machinery M comprises a motor m for rotating the rope wheel 1,1',1",1'''. The elevator comprises a hoistway H, and an elevator car C vertically moveable in the hoistway H, and an elevator controller 100, which is configured to automatically control the motor m of the machinery M. The elevator moreover comprises a counterweight CW and the belts 2 interconnect the car C and counterweight CW. The rope wheel 1,1',1",1''' engages the section of each belt 2 extending between the car C and counterweight CW. In the illustrated embodiment, the belts suspend the elevator car C and the counterweight CW.

Figure 17:
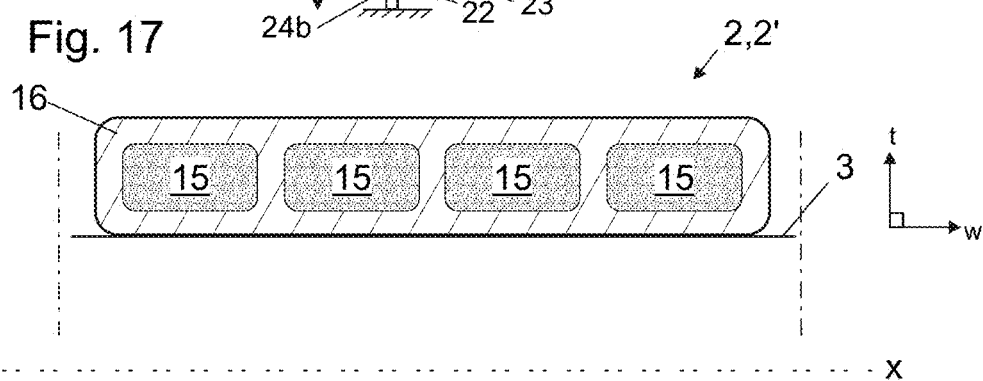
FIG. 17 illustrates preferred details of the belt.

FIG. 17 illustrates preferred details of each belt 2,2' and the rim surface 3 against and around which it is placed to pass in FIGS. 1-16. In this case, the belt 2,2' comprises a flat side surface placed to pass against and around a rim surface 3 of the rope wheel 1,1',1",1'". In context of an elevator provided with this this feature the rope guidance as described is particularly advantageous, because the rim surface and the rope surface can be manufactured to be simple yet the guidance is efficient. For example, the belt can be made extremely lightweight since no contour need to be added to form a specific shape. The topography of specific shapes intending shape locking typically substantially increase need of coating material, which has a proportionally big and meaningful effect on total weight of a lightweight non-metallic rope.

The belt 2,2' is placed to pass against and around the rim surface 3 without shape locking, in particular frictionally. In context of an elevator provided with this this feature the rope guidance as described is particularly advantageous, because the rim surface and the rope surface can be manufactured to be simple yet the guidance is efficient. For example, the belt can be made extremely lightweight since no contour need to be added to form a specific shape. The topography of specific shapes intending shape locking typically substantially increase need of coating material, which has a proportionally big and meaningful effect on total weight of a lightweight non-metallic rope.

The width of the rim surface 3 as measured in direction of said central axis x is at least equal to or greater than the width of the belt 2,2' as measured in direction of said central axis x. The width of the rim surface 3 as measured in direction of said central axis x is less than 2 times, more preferably less than 1.5 times, most preferably less than 1.2 times the width of the belt 2,2' placed to pass against and around it as measured in direction of said central axis x.

In the preferred embodiment, neither of the rim surface 3 and the belt 2,2' placed to pass against and around it has protrusions (such as longitudinal ribs or transverse ribs e.g. teeth) extending into a recess of the other. In context of an elevator provided with this this feature the rope guidance as described is particularly advantageous, because the rim surface and the rope surface can be manufactured to be simple yet the guidance is efficient. For example, the belt can be made extremely lightweight since no contour need to be added to form a specific shape. The topography of specific shapes intending shape locking typically substantially increase need of coating material, which has a proportionally big and meaningful effect on total weight of a lightweight non-metallic rope.

In the embodiment illustrated, the belt 2,2' comprises load bearing members 15 extending in longitudinal direction of the belt 2,2' throughout the length thereof and embedded in a coating 16 forming the outer surface of the rope 2,2'. The coating 16 comprises polymer material such as polyurethane for example, or alternatively rubber or silicone. The coating 16 is in contact with the rim surface 3 of the rope wheel 1,1',1",1'". The coating 16 protects and binds the load bearing members 15 together when there are more than one of them in the belt as well as provides a way to adjust (typically increase) the friction coefficient of the belt. The coating 16 may not be necessary if there is only one load bearing member. However, the coating 16 is advantageous despite the number of load bearing members due to its advantageous effects in terms of protection and friction adjustment.

The rope 2,2' illustrated is a belt, i.e. substantially larger in width direction w than in thickness direction t, which increases firmness of engagement between it and the rope wheel 1,1',1",1'".

In a preferred embodiment, each said load bearing member 15 is preferably made of composite material comprising reinforcing fibers embedded in polymer matrix, said reinforcing fibers preferably being carbon fibers or glass fibers. The rope 2,2' can thus be non-metallic and lightweight, which makes the elevator more economical to use and manufacture, its components being possible to dimension lightweight and economical to manufacture and/or accelerate in use. These advantageous effects are reflected not only to moving components but also to stationary components of the elevator. With this type of load bearing members 15 guidance as described is particularly advantageous, because the rim surface and the belt structure can be manufactured to be simple yet the guidance is efficient. For example, the belt, which can with lightweight structure provide load bearing function, can provide traction transmission with lightweight structure, whereby the belt can be made extremely lightweight, since no contour need to be added to form a specific shape. The topography of specific shapes intending shape locking typically substantially increase need of coating material, which has a proportionally big and meaningful effect on total weight of a lightweight non-metallic rope. The load bearing members 16 and/or the coating 15 can have a structure as described in international patent document WO2009090299A1, for example. For example, FIGS. 1a, 1d, 1e and 1h-1m thereof illustrate well compatible cross sections and/or materials. Alternative materials for the load bearing members can used, such as metal strands, for example.

Figure 18:
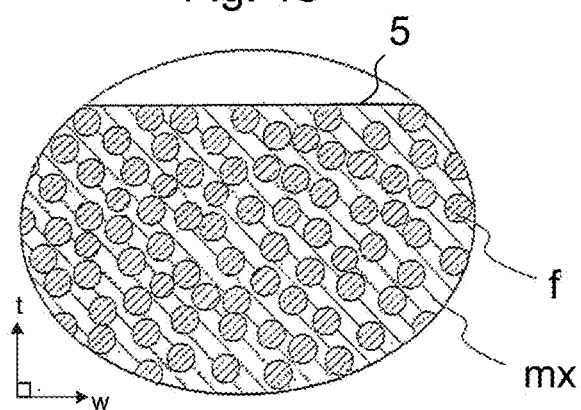
FIGS. 18 and 19 illustrates preferred details of a load bearing member of the belt.
Figure 19:
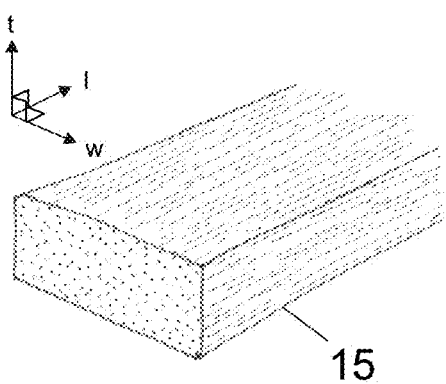

FIG. 18 illustrates a preferred inner structure for said load bearing member 15, showing inside the circle an enlarged view of the cross section of the load bearing member 15 close to the surface thereof, as viewed in the longitudinal direction 1 of the load bearing member 15. The parts of the load bearing member 15 not showed in FIG. 18 have a similar structure. FIG. 19 illustrates the load bearing member 15 three dimensionally. The load bearing member 15 is made of composite material comprising reinforcing fibers f embedded in polymer matrix mx. The reinforcing fibers f are more specifically distributed evenly in polymer matrix mx and bound to each other by the polymer matrix mx. This has been done e.g. in the manufacturing phase by immersing them together in the fluid material of the polymer matrix which is thereafter solidified. The load bearing member 15 formed is a solid elongated rod-like one-piece structure. Said reinforcing fibers f are most preferably carbon fibers, but alternatively they can be glass fibers, or possibly some other fibers. Preferably, the reinforcing fibers f of each load bearing member 15 are parallel with the longitudinal direction of the load bearing member 15. Thereby, the fibers f are also parallel with the longitudinal direction of the belt 2,2' as each load bearing member 15 is oriented parallel with the longitudinal direction of the belt 2,2'. This is advantageous for the rigidity as well as behavior in bending. Owing to the parallel structure, the fibers in the belt 2 will be aligned with the force when the belt 2 is pulled, which ensures that the structure provides high tensile stiffness. The fibers f used in the preferred embodiments are accordingly substantially untwisted in relation to each other, which provides them said orientation parallel with the longitudinal direction of the belt

2,2'. This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member 15, preferably continuing for the whole length of the load bearing member 15.

The composite matrix mx, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but any other suitable alternative materials can be used.

The matrix mx of the load bearing member 15 is most preferably hard in its material properties. A hard matrix mx helps to support the reinforcing fibers f, especially when the rope bends, preventing buckling of the reinforcing fibers f of the bent rope, because the hard material supports the fibers f efficiently. The most preferred materials for the matrix are epoxy resin, polyester, phenolic plastic or vinyl ester. The polymer matrix mx is preferably so hard that its module of elasticity (E) is over 2 GPa, most preferably over 2.5 GPa. In this case the module of elasticity E is preferably in the range 2.5-10 GPa, most preferably in the range 2.5-4.5 GPa. There are commercially available various material alternatives for the matrix mx which can provide these material properties. However, the polymer matrix need not be this hard necessarily, e.g. if the downsides of a softer material are deemed acceptable or irrelevant for the intended use. In that case, the polymer matrix mx can be made of elastomer material such as polyurethane or rubber for instance Preferably over 50% proportion of the surface area of the cross-section of the load bearing member 15 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix mx. Most preferably, this is carried out such that approx. 60% of the surface area is of reinforcing fiber and approx. 40% is of matrix material (preferably epoxy material). In this way a good longitudinal stiffness for the load bearing member 15 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The load bearing members 15 are preferably each completely non-metallic, i.e. made not to comprise metal.

In the illustrated embodiments, the load bearing members 15 are substantially rectangular and larger in width direction than thickness direction. However, this is not necessary as alternative shapes could be used. Likewise, it is not necessary that the number of the load bearing members is four which is used for the purpose of the example. The number of the load bearing members 15 can be greater or smaller. The number can be one, two or three for instance, in which cases it may be preferably to shape it/them wider than what is shown in Figures.

In the preferred embodiments, an advantageous structure for the belt 2,2' has been disclosed. However, the invention can be utilized with also other kind of ropes such as with other kinds of belt-shaped ropes having different materials or shapes. At least part of the advantages can be achieved also if the belt is for example manufactured without a coating or the load bearing members have a different shape than showed or the load bearing members comprise metallic material, or the load bearing members have a twisted structure (e.g. strands).

As mentioned, the motor m is arranged to rotate the rope wheel 1;1';1";1'", which is then a traction wheel. Generally, for this purpose, the rope wheel 1;1';1";1'" is preferably either directly fixed on or integral with the rotor r of the motor m. Alternatively, there could be a force transmission, such as gears, between the motor m and the rope wheel 1;1';1";1'".

As an alternative to being a traction wheel, a rope wheel 1;1';1";1'" as described referring to any of the Figures can also be arranged to serve additional and/or alternative elevator functions than providing traction. As described FIG. 16 illustrates a rope wheel 1;1';1";1'" serving as a traction wheel of a drive machinery M, FIG. 16 moreover illustrates a rope wheel 1;1';1";1'" as described serving as a freely rotating rope wheel guiding suspension ropes 2 and a freely rotating rope wheel guiding compensation ropes 2'. Accordingly, in FIG. 16, the elevator comprises a rope wheel 1;1';1";1'", which is a freely rotating arranged to guide one or more belts 2 which are suspension belts (belt-shaped suspension ropes) of the elevator. In FIG. 16, the elevator moreover comprises a rope wheel 1;1';1";1'", which is a freely rotating rope wheel of a compensator 20 comprised in the elevator as illustrated in FIG. 16. The compensator 20 comprises a frame 21 on which the rope wheel 1;1';1";1'" is mounted. The frame 21 is vertically movable having a movement range r, the movement preferably being guided by guide rails 22 and delimited by stoppers 24a,24b for blocking movement of the frame 21, in particular a first stopper 24a for blocking movement of the frame 21 above a first limit and a second stopper 24b for blocking movement of the frame 21 below a second limit. One or more tensioning weights 23 are preferably mounted on the frame 21 for tensioning the ropes 2' guided by the rope wheels 1;1';1";1'" of the compensator 20. The total weight of said one or more tensioning weights 23 is preferably more than 10 kg, more preferably more than 50 kg. When the rope wheel 1;1';1";1'" is a freely rotating rope wheel as illustrated in FIG. 16, the rope wheel 1;1';1"; 1'" is otherwise in accordance to FIG. 1 but it does not comprise a motor m as illustrated in FIG. 1. Instead, it is mounted rotatably on a frame 19, 21, as illustrated in FIG. 16.

Figure 20:
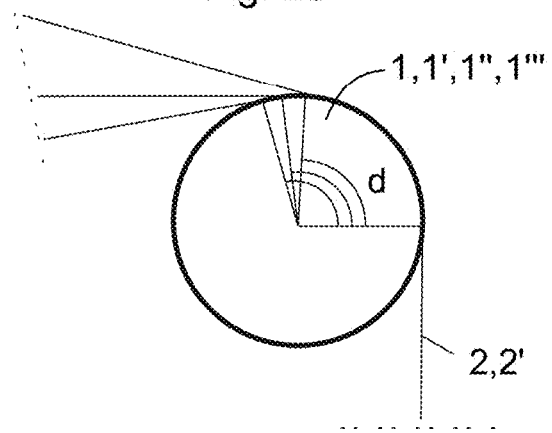
FIG. 20 illustrates preferred alternative wrap angles when implementing the rope wheel of FIGS. 1-16.

Generally, belt guidance by a rope wheel 1;1';1";1'" as described are particularly advantageous when the wrap angle of the rope wheel is relatively small. Due to small wrap angle, belt guidance by other guiding means may be ineffective. Particularly, when no shape locking is present, e.g. when the rim surfaces 3 are cambered or parallel with axis x, the contact length may not be sufficiently long to enable reliable belt guidance in all situations. FIG. 20 illustrates the rope wheel 1;1';1";1'" and belts 2,2' when the wrap angle, i.e. the angle d of contact between the belt and the rim surface 3 against and around which the belt is placed to pass, is small. In FIG. 20, each said belt 2,2' is placed to pass against and around the circular rim surface 3 of the rope wheel 1;1';1";1'" such that the angle of contact d is substantially less than 180 degrees, in particular less than 135 degrees. In FIG. 20, three different wrap angles are illustrated. The angle may be 90 degrees for instance. At smallest, the angle d is even less than 90 degrees, corresponding to the angle d realized in FIG. 16 with the freely rotating rope wheel 1;1';1";1'" guiding the suspension ropes 2. In a case like this where the wrap angle is extremely small, the advantages of guidance are particularly considerable.

The guidance by flanges as described is particularly advantageous when there is no shape locking engagement between the belt and the rim surface. In this context, the guidance by flanges as described is particularly advantageous since an hereby owing to the guidance by flanges the rim surfaces 3 are simple to manufacture.

In the preferred embodiments illustrated, the tangential projection of each said circular rim surface 3 is parallel with the central axis x. This is advantageous, since hereby the belt can pass against and around the circular rim surface without deformation, such as bending deformation caused by cambering, for example. Additional deformation would cause additional tension and form an additional cause of damage for the load bearing members and/or coating of the belt. This is particularly advantageous in context of belts, which comprise brittle load bearing members, such as load bearing members comprising composite material and/or a coating. Moreover, the circular rim surface 3 is extremely simple to manufacture. In this context, the guidance by flanges as described is particularly advantageous since hereby well working guidance can be provided despite the shape of the tangential projection.

As mentioned, it is advantageous if the tangential projection of each said circular rim surface 3 is parallel with the central axis x and no shape locking features need to exist between the belt and the rim surface. Some of the advantages of the described guidance by flanges can be present however also when there is also other means (in addition to the flanges) for guidance present, such as cambering of the rim surfaces or possibly polyvee or tooth-shape locking between the belt and the rim surface. In these cases, for example when the rim surface 3 has a cambered shape, the described guidance by flanges is advantageous due to its ability to serve as a secondary guidance serving as a backup for the primary guidance, i.e. here the cambered shape. Also, at least part of the advantages related to reduction of problems caused by chafing are present regardless of what kind of shape the rim surface has.

In the illustrated embodiments, each rim surface 3 is suitable for/arranged to engage only one belt 2,2'. A flange 4b;4c is disposed between rim surfaces 3 that are next to each other in axial direction. In the illustrated embodiments, each flange 4b;4c disposed between rim surfaces 3 comprises a circular array of guide parts 5-5'" forming, at least partially, the opposite flanks of the flange.

Generally, the guide surface portion 5a-5a'" can be made of any material, most preferably of metal or polymer material, such as plastic or rubber for instance, or of a composite material comprising reinforcing fibers in a polymer matrix.

As mentioned, each said guide flange 4a-4d comprises a circular array of guide parts 5,5',5",5'". The array is preferably such that the guide parts 5,5',5",5'" together form a full circle, preferably where the guide parts 5,5',5",5'" are in a line one after the other.

In some examples a spring operating as a torsion spring has been disclosed. However, any known kind of elastically deformable component able to produce spring force can be used in stead of the springs illustrated in the preferred examples. For example a coil spring or practically any elastically compressible component can be arranged to operate as a compression spring and thereby able to produce a spring force against which a movable guide part can be moved towards the central axis.

Generally, as indicated, the rope wheel 1;1';1";1'" can comprise only one of the circular rim surfaces 3 with flanges on axial sides thereof as described or plurality of them. Accordingly, it is possible that the rope wheel 1;1';1";1'" guides only one belt, although preferably plurality of them.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A rope wheel for an elevator, the rope wheel comprising:
   a circular rim surface; and
   a plurality of circular guide flanges that are side by side in an axial direction extending along a central axis of the rope wheel, the plurality of circular guide flanges including adjacent circular guide flanges that are on opposite axial sides of the circular rim surface,
   wherein the circular rim surface is configured to enable a belt to pass against and around the circular rim surface, and the plurality of circular guide flanges are configured to guide the belt passing against and around the circular rim surface, and
   wherein each separate circular guide flange of the adjacent circular guide flanges includes a circular array of movable guide parts, each movable guide part of each circular array of movable guide parts including a guide surface portion configured to guide the belt passing against and around the circular rim surface, the guide surface portion configured to move towards the central axis in relation to both the circular rim surface and at least a portion of the separate circular guide flange.

2. The rope wheel according to claim 1, wherein
   the rope wheel includes a plurality of circular rim surfaces that are side by side in the axial direction, the plurality of circular rim surfaces including the circular rim surface, each separate circular rim surface of the plurality of circular rim surfaces being axially between a separate two circular guide flanges of the plurality of circular guide flanges, and
   the rope wheel is a traction wheel that is configured to drive a plurality of belts such that the plurality of circular rim surfaces are configured to guide separate, respective belts to pass against and around separate, respective circular rim surfaces of the plurality of circular rim surfaces.

3. The rope wheel according to claim 1, wherein each movable guide part of each circular guide flange of the adjacent circular guide flanges at least partially defines a part of a flank of the circular guide flange.

4. The rope wheel according to claim 1, wherein the guide surface portion faces directly or at an angle towards the axial direction.

5. The rope wheel according to claim 1, wherein the circular rim surface and each guide surface portion of the adjacent circular guide flanges that are on the opposite axial sides of the circular rim surface at least partially define a radially open groove configured to receive the belt passing against and around the circular rim surface.

6. The rope wheel according to claim 1, wherein each movable guide part is slidably movable.

7. The rope wheel according to claim 1, wherein each movable guide part is supported by a slide surface, the movable guide part configured to slide back and forth against the slide surface, such that the movable guide part is configured to slide towards the central axis and back outwards from the central axis.

8. The rope wheel according to claim 1, wherein each movable guide part is movable against a spring force such that the guide surface portion of the movable guide part moves towards the central axis.

9. The rope wheel according to claim 1, wherein
each guide surface portion, of each separate circular array of movable guide parts of the adjacent circular guide flanges on the opposite axial sides of the circular rim surface, extends radially farther away from the central axis than the circular rim surface, such that the guide surface portion is configured to form an obstacle with which the belt passing against and around the circular rim surface collides in response to the belt becoming displaced in relation to the circular rim surface in the axial direction.

10. The rope wheel according to claim 1, wherein,
each movable guide part, of each circular guide flange of the adjacent circular guide flanges on the opposite axial sides of the circular rim surface, is configured to move under a radial force exerted on the guide surface portion of the movable guide part, by the belt passing against and around the circular rim surface, in response to the belt becoming displaced in relation to the circular rim surface, such that the guide surface portion moves towards the central axis.

11. The rope wheel according to claim 1, wherein each movable guide part is rotatably movable.

12. The rope wheel according to claim 1, wherein each movable guide part is a roller having a rim that at least partially defines the guide surface portion of the movable guide part.

13. The rope wheel according to claim 1, wherein a tangential projection of the circular rim surface is parallel with the central axis.

14. A drive machinery for an elevator, the drive machinery comprising the rope wheel of claim 1, wherein the rope wheel is a traction wheel, and the drive machinery is configured to drive a belt such that the belt passes against and around the circular rim surface of the rope wheel.

15. An elevator comprising the drive machinery as defined in claim 14.

16. The elevator according to claim 15, wherein
the traction wheel includes a plurality of circular rim surfaces side by side in the axial direction, the plurality of circular rim surfaces including the circular rim surface, and
the drive machinery is configure to drive a plurality of belts such that separate, respective belts of the plurality of belts pass against and around separate, respective circular rim surfaces of the plurality of circular rim surfaces of the traction wheel.

17. The elevator according to claim 16, wherein the drive machinery is configured to drive the plurality of belts such that each separate belt of the plurality of belts passes against and around a separate circular rim surface of the plurality of circular rim surfaces without shape locking between the separate belt and the separate circular rim surface.

18. The elevator according to claim 15, wherein the belt comprises one or more load bearing members extending in a longitudinal direction of the belt throughout a length of the belt, wherein the one or more load bearing members are embedded in a coating forming an outer surface of the belt, wherein each load bearing member of the one or more load bearing members comprising a composite material, the composite material comprising non-metallic reinforcing fibers embedded in a polymer matrix, the non-metallic reinforcing fibers being carbon fibers or glass fibers.

19. The elevator according to claim 15, the elevator further comprising compensator, wherein the rope wheel is a rope wheel of the compensator and is configured to guide compensation ropes of the elevator.

20. The elevator according to claim 15, wherein the drive machinery is configured to drive the belt such that an angle of contact between the belt and the circular rim surface against and around which the belt passes is less than 180 degrees.

* * * * *